United States Patent Office 3,210,414
Patented Oct. 5, 1965

3,210,414
PROCESS FOR PREPARING 2-METHOXY-
3,5,6-TRICHLOROBENZOIC ACID
Delbert L. Hanna, Oak Park, Ill., assignor to Velsicol
Chemical Corporation, Chicago, Ill., a corporation of
Illinois
No Drawing. Filed May 24, 1961, Ser. No. 112,186
7 Claims. (Cl. 260—521)

This invention relates to a method for preparing a pesticidal composition of matter. More specifically, this invention relates to a method for the preparation of 2-methoxy-3,5,6-trichlorobenzoic acid.

2-methoxy-3,5,6-trichlorobenzoic acid has been found to be a highly active compound useful as a herbicide for the control of a wide variety of undesirable plants. Heretofore, however, the commercial use of this compound as a herbicide has been limited by the difficulty in preparing it readily and in good yield from economically feasible starting materials. The positions of the methoxy group and the chlorine atoms on the benzene ring of this compound have been found to be a critical factor in its toxicity to weeds. However, it is well known to those skilled in the art that the directing of specific functional groups and atoms into certain positions on the benzene ring offers many difficulties. Indirect synthetic routes via expensive intermediates must often be used to give only very low yields of the desired product.

Heretofore, 2-methoxy-3,5,6-trichlorobenzoic acid has been prepared in a three-step process from salicylic acid. Salicylic acid is first chlorinated in a solvent such as glacial acetic acid at a temperature below about 35° C. to give an approximately 75% yield of 3,5-dichlorosalicylic acid. The intermediate 3,5-dichlorosalicylic acid is then treated with chlorine in an excess of 65% fuming sulfuric acid at a temperature of about 80–90° C. to convert it in about 70% yield to 3,5,6-trichlorosalicylic acid. Finally, the 3,5,6-trichlorosalicylic acid is converted to its disodium salt with sodium hydroxide, treated with a large excess of dimethyl sulfate, hydrolyzed with caustic, and then treated with dilute acid to separate the desired 2-methoxy-3,5,6-trichlorobenzoic acid in a yield of about 65%. The overall yield from the salicylic acid starting material is therefore only about 35% of the theoretical amount. Further, the process requires the use of toxic chemicals such as fuming sulfuric acid and dimethyl sulfate. The last step of the process, in particular, requires large excesses of the dimethyl sulfate, which is poorly utilized in the reaction. The process is consequently uneconomic and disadvantages for commercial use.

It is therefore an object of this invention to provide a method for the preparation of 2-methoxy-3,5,6-trichlorobenzoic acid in high yield.

It is a further object of this invention to provide a method for the preparation of 2-methoxy-3,5,6-trichlorobenzoic acid from readily available starting materials.

It is another object of this invention to provide a method for the preparation of 2-methoxy-3,5,6-trichlorobenzoic acid which utilizes commercially economic reagents which can be handled with comparative ease and safety.

It has now been found that 2-methoxy-3,5,6-trichlorobenzoic acid can be prepared readily and in excellent yield by the method of this invention, which comprises reacting 2-methoxy-3,6-dichlorobenzoic acid and chlorine in the absence of actinic radiation in a solvent system which comprises at least one polar organic solvent. The fact that 2-methoxy-3,5,6-trichlorobenzoic acid can be prepared in nearly quantitative yields by the direct reaction of 2-methoxy-3,6-dichlorobenzoic acid and chlorine was surprising and unexpected. Firstly, two positions on the benzene ring in 2-methoxy-3,6-dichlorobenzoic acid, namely the 4- and the 5-positions, are available for substitution by additional chlorine. One would therefore expect that the direct chlorination of 2-methoxy-3,6-dichlorobenzoic acid would lead to a mixture of the 3,5,6- and the 3,4,6-trichloro compounds. Yet, it has been found that even in the absence of special directive catalysts, the process of this invention results in a product which is nearly all the 3,5,6-trichloro isomer, with almost none of the 3,4,6-trichloro isomer being formed.

It was further unexpected that the chlorination of 2-methoxy-3,6-dichlorobenzoic acid by the process of this invention should produce any 2-methoxy-3,5,6-trichlorobenzoic acid, since attempts to chlorinate 2-methoxy-3,6-dichlorobenzoic acid in the conventional manner failed to produce the desired 2-methoxy-3,5,6-trichlorobenzoic acid. For example, when the chlorination was attempted in carbon tetrachloride or in sulfuric acid solution, the 2-methoxy-3,5,6-trichlorobenzoic acid was not obtained.

The 2-methoxy-3,6-dichlorobenzoic acid used as starting material in the method of this invention is a known chemical compound. According to the method of this invention, 2-methoxy-3,6-dichlorobenzoic acid is reacted with chlorine in the absence of actinic radiation in a solvent system which comprises at least one polar organic solvent. By polar organic solvents are meant those organic solvents which contain the hydroxy or ketonic groups and are associated with strong polarity and high dielectric constants. Typical examples of such solvents are ethyl alcohol, methyl alcohol, acetone, n-propyl alcohol, isopropyl alcohol, methyl ethyl ketone, n-butyl alcohol, diacetone alcohol, tert-butyl alcohol, acetic acid, amyl alcohol, isoamyl alcohol, propionic acid, n-decyl alcohol, and the like.

The solvent system can consist entirely of a single polar organic solvent. However, it is often desirable in carrying out the method of this invention to use a solvent system which comprises at least one polar organic solvent mixed with a nonpolar oslvent or solvents. Such mixtures are often advantageous to modify solubility characteristics, to lower or increase the reflux temperature of the solvent system, to utilize inexpensive solvents in part for more expensive ones, and the like. Any suitable nonpolar solvents for the reactants may be used in mixtures with the polar organic solvent or solvents. Typical of such solvents are aliphatic hydrocarbons such as pentane, cyclopentane, or hexane; aromatic hydrocarbons such as benzene or toluene; chlorinated hydrocarbons such as chloroform, carbon tetrachloride, tetrachloroethane, and chlorobenzene; carbon disulfide, and the like. The proportions in which the solvents are mixed to form the solvent system is not critical and will depent largely on the characteristics it is desired to impart to the solvent system. A preferred solvent system, however, will comprise at least about 25% by volume of the solvents of at least one polar organic solvent.

It has been found that the chlorination of 2-methoxy-3,6-dichlorobenzoic acid does not take place satisfactorily when actinic radiation is allowed to contact the reaction mixture. Therefore, the method of this invention is carried out in the absence of actinic radition. By actinic radiation is meant the violet and ultraviolet portion of the electromagnetic spectrum, which is usually effective in producing chemical changes and biological action. In order to make certain that actinic radiation does not contact the reaction mixture, the chlorination reaction in the method of this invention should be carried out in total darkness in reaction vessels sealed from light.

The method of this invention can be carried out at a variety of temperatures which will be largely dependent upon the particular solvent system employed. However, very high temperatures are to be avoided in order to minimize possible decomposition of the reactants. Similarly, very low temperatures are not suitable, since the rate of reaction at such temperatures is to low to be practical. Generally, temperatures in the range from about 15° C. to about the reflux temperature of the reaction mixture are convenient. Reaction temperatures in the range from about 20° to about 45° are preferred. While the method of this invention will ordinarily be carried out at atmospheric pressure, sub or superatmospheric pressures can also be used if desired.

The reaction is carried out until tests on samples of the reaction mixture reveal that the chlorination is no longer taking place. The product can be isolated by stripping off excess chlorine and solvent, preferably under vacuum. The resulting residue will ordinarily be sufficiently pure for pesticidal use and can be formulated without further purification. However, any of the recognized techniques known to the art can be employed to further purify the product if desired. For example, the product can be recrystallized from a suitable solvent such as heptane to give pure, crystalline 2-methoxy-3,5,6-trichlorobenzoic acid having a melting point of 137–139° C.

It is obvious from the above process description that the method of this invention for preparing 2-methoxy-3,5,6-trichlorobenzoic acid is not only surprising and unexpected in view of techniques known to the art but is also clearly superior and possessed of many advantages. The following examples illustrate the manner in which 2-methoxy-3,5,6-trichlorobenzoic acid can be prepared in excellent yield from readily obtainable starting material and reagents by the method of this invention. All temperatures are in degrees centigrade.

*Example 1*

A glass-lined steel kettle sealed from light and fitted with a Teflon dip tube, agitator, cooling jacket, and condenser was charged with 7,450 parts by weight of carbon tetrachloride, 1,250 parts by weight of absolute methanol, and 3,120 parts by weight of 2-methoxy-3,6-dichlorobenzoic acid. The solution was then saturated with chlorine gas, and the saturation was maintained for about 45 hours while the temperature of the reaction mixture was maintained at about 30° C. At the end of this time, the solvents were distilled off under vacuum, and the residue was dried in a forced air dryer to give a 90% yield of 2-methoxy-3,5,6-trichlorobenzoic acid.

*Example 2*

The apparatus described in Example 1 is charged with 3,120 parts by weight of 2-methoxy-3,6-dichlorobenzoic acid and 4,500 parts by weight of a solvent mixture consisting of equal parts by volume of chloroform and methyl alcohol. The mixture is saturated with chlorine gas and maintained at a temperature of 15° C. until the chlorination is complete. The reaction mixture is then worked up as described in Example 1 to give a residue containing the desired 2-methoxy-3,5,6-trichlorobenzoic acid.

*Example 3*

A mixture of 3,000 parts by weight of 2-methoxy-3,6-dichlorobenzoic acid and 4,000 parts by weight of a mixture consisting of 10 parts by volume of absolute methanol and 90 parts of methylene chloride is charged into the apparatus described in Example 1. The mixture is saturated with chlorine gas and maintained at gentle reflux temperature until samples taken frequently from the reaction mixture indicate that 2-methoxy-3,5,6-trichlorobenzoic acid is present in good yield. The solvents are then stripped in vacuo, and the residue is recrystallized from hexane until a product having a melting point of 137–139° C. is obtained.

*Example 4*

The apparatus of Example 1 is charged with 3,000 parts by weight of 2-methoxy-3,6-dichlorobenzoic acid and 4,500 parts by weight of a mixture which consists of 75 parts by volume of carbon tetrachloride and 25 parts of absolute ethanol. The mixture is saturated with chlorine gas and maintained at a temperature of 20° C. until the chlorination is essentially complete. The excess chlorine is then stripped in vacuo at reflux temperature with the aid of air blown through the reaction mixture. The solvents are distilled off in vacuo. The residue is dissolved in hot hexane; and the solution is cooled to crystallize the 2-methoxy-3,5,6-trichlorobenzoic acid, which is centrifuged and dried.

*Example 5*

A mixture of 3,000 parts by weight of 2-methoxy-3,6-dichlorobenzoic acid and 5,000 parts by weight of glacial acetic acid is charged into the apparatus of Example 1. The mixture is saturated with chlorine gas and maintained at a temperature of 30° C. until formation of 2-methoxy-3,5,6-trichlorobenzoic acid is no longer observed. The solvent is then stripped as quickly as possible under vacuum to give a residue containing 2-methoxy-3,5,6-trichlorobenzoic acid in high yield.

*Example 6*

The apparatus of Example 1 is charged with 3,120 parts by weight of 2-methoxy-3,6-dichlorobenzoic acid and 8,500 parts by weight of a solvent mixture consisting of 25% by volume absolute methanol and 75% carbon tetrachloride. The solution is saturated with chlorine gas and maintained at a temperature of 45° C. until samples of the reaction mixture indicate that 2-methoxy-3,5,6-trichlorobenzoic acid is present in high yield. The solvents are then distilled off under vacuum to give a residue ready for drying and incorporation into pesticidal formulations.

I claim:

1. The method for the preparation of 2-methoxy-3,5,6-trichlorobenzoic acid which comprises reacting 2-methoxy-3,6-dichlorobenzoic acid and chlorine in the absence of actinic radiation at a temperature of from about 20° C. to about 45° C. in an organic solvent system which comprises at least one polar organic solvent.

2. The method for the preparation of 2-methoxy-3,5,6-trichlorobenzoic acid which comprises reacting 2-methoxy-3,6-dichlorobenzoic acid and chlorine in the absence of actinic radiation at a temperature of from about 20° C. to about 45° C. in an organic solvent system which comprises at least about 25% by volume of at least one polar organic solvent.

3. The method for the preparation of 2-methoxy-3,5,6-trichlorobenzoic acid which comprises reacting 2-methoxy-3,6-dichlorobenzoic acid and chlorine in the absence of actinic radiation at a temperature of from about 20° C. to about 45° C. in a solvent system which comprises carbon tetrachloride and at least about 25% by volume of absolute methanol.

4. The method of claim 2 wherein the temperature is about 30° C. and the solvent system consists of carbon tetrachloride and 25% by volume of absolute methanol.

5. The method of claim 2, wherein the solvent system consists of equal parts by volume of absolute methanol and chloroform.

6. The method of claim 2, wherein the temperature is about 30° C. and the solvent system consists of glacial acetic acid.

7. The method of claim 2, wherein the temperature is about 20° C. and the solvent system sonsists of carbon tetrachloride and 25% by volume of absolute ethanel.

References Cited by the Examiner

UNITED STATES PATENTS

| | | | |
|---|---|---|---|
| 2,675,409 | 4/54 | Orloff et al. | 260—694 |
| 2,811,547 | 10/57 | Brown | 260—521 |

OTHER REFERENCES

De La Mere et al.: Aromatic Substitution, pages 131 to 146 (1959).

Groggins: Unit Processes in Organic Synthesis, 4th ed., pages 177 and 210 (1952).

LORRAINE A. WEINBERGER, *Primary Examiner.*

CHARLES B. PARKER, *Examiner.*

UNITED STATES PATENT OFFICE
CERTIFICATE OF CORRECTION

Patent No. 3,210,414　　　　　　　　　　　　　　　October 5, 1965

Delbert L. Hanna

It is hereby certified that error appears in the above numbered patent requiring correction and that the said Letters Patent should read as corrected below.

Column 1, line 51, for "disadvantages" read -- disadvantageous --; column 2, line 44, for "oslvent" read -- solvent --; line 58, for "depent" read --depend --; line 66, for "radition" read -- radiation --; column 3, line 13, for "is to low" read -- is too low --; line 17, for "45°" read -- 45° C. --; column 5, line 2, for "sonsists" read -- consists --; line 3, for "ethanel" read -- ethanol --.

Signed and sealed this 19th day of July 1966.

(SEAL)
Attest:

ERNEST W. SWIDER
Attesting Officer

EDWARD J. BRENNER
Commissioner of Patents